(12) United States Patent
Meyer

(10) Patent No.: US 10,366,585 B2
(45) Date of Patent: Jul. 30, 2019

(54) METHOD FOR OPERATING A SURFACE TREATMENT DEVICE

(71) Applicant: Vorwerk & Co. Interholding GmbH, Wuppertal (DE)

(72) Inventor: Frank Meyer, Iserlohn (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/744,195

(22) PCT Filed: Jul. 4, 2016

(86) PCT No.: PCT/EP2016/065690
§ 371 (c)(1),
(2) Date: Jan. 12, 2018

(87) PCT Pub. No.: WO2017/009083
PCT Pub. Date: Jan. 19, 2017

(65) Prior Publication Data
US 2018/0204431 A1 Jul. 19, 2018

(30) Foreign Application Priority Data
Jul. 14, 2015 (DE) .................. 10 2015 111 392

(51) Int. Cl.
*G08B 13/08* (2006.01)
*G08B 13/16* (2006.01)
(Continued)

(52) U.S. Cl.
CPC ...... *G08B 13/1672* (2013.01); *A47L 11/4011* (2013.01); *G05D 1/0255* (2013.01);
(Continued)

(58) Field of Classification Search
CPC .. G08B 13/1672; G08B 13/08; G05D 1/0255; A47L 2201/04
See application file for complete search history.

(56) References Cited

U.S. PATENT DOCUMENTS 5,202,661 A * 4/1993 Everett, Jr. .......... G05D 1/0255
340/522
5,446,445 A * 8/1995 Bloomfield ............ G08B 17/10
340/521
(Continued)

FOREIGN PATENT DOCUMENTS

CN 103142188 A 6/2013
DE 10 2008 014 912 A1 9/2009
(Continued)

OTHER PUBLICATIONS

International Search Report of PCT/EP2016/065690, dated Oct. 6, 2016.
(Continued)

*Primary Examiner* — Phung Nguyen
(74) *Attorney, Agent, or Firm* — Collard & Roe, P.C.

(57) ABSTRACT

A method for operating an automatically movable surface treatment device that can move in a room and possibly carries out surface treatment. An ultrasonic sensor detects ultrasound, in particular ultrasonic waves reflected at obstacles. The ultrasonic sensor detects glass breakage noises, wherein frequencies of sound detected by means of the ultrasonic sensor are compared with reference frequencies typically occurring in the event of a glass breakage, and wherein, in the event of a match, a glass breakage, in particular a break-in through a pane of glass of a window or of a door, is determined. A system comprising an automatically movable surface treatment device having an ultrasonic
(Continued)

sensor and a house alarm system in which the surface treatment device is integrated in terms of communication.

11 Claims, 3 Drawing Sheets

(51) Int. Cl.
   *G05D 1/02* (2006.01)
   *G08B 29/18* (2006.01)
   *A47L 11/40* (2006.01)

(52) U.S. Cl.
   CPC ......... *G05D 1/0274* (2013.01); *G08B 29/185* (2013.01); *A47L 2201/04* (2013.01); *G05D 2201/0209* (2013.01); *G05D 2201/0215* (2013.01)

(56) References Cited

U.S. PATENT DOCUMENTS

| | | | |
|---|---|---|---|
| 5,742,232 A | 4/1998 | Kurahashi et al. | |
| 5,831,528 A * | 11/1998 | Cecic | G08B 13/04 340/550 |
| 6,225,910 B1 | 5/2001 | Kadwell et al. | |
| 9,968,232 B2 * | 5/2018 | Watanabe | A47L 9/28 |
| 2005/0237189 A1 | 10/2005 | Tani | |
| 2006/0061478 A1 | 3/2006 | Kim | |
| 2006/0192669 A1 * | 8/2006 | Allen | B60R 25/1009 340/522 |
| 2017/0169682 A1 | 6/2017 | Bressanutti et al. | |
| 2017/0370835 A1 | 12/2017 | Di Marco et al. | |
| 2018/0084965 A1 | 3/2018 | Huang | |

FOREIGN PATENT DOCUMENTS

| | | |
|---|---|---|
| EP | 2 423 893 A1 | 2/2012 |
| EP | 2 423 893 B1 | 4/2013 |
| JP | 2001-253319 A | 9/2001 |
| WO | 96/10513 A1 | 5/1993 |

OTHER PUBLICATIONS

International Search Report of PCT/EP2016/068300, dated Oct. 24, 2016.

* cited by examiner

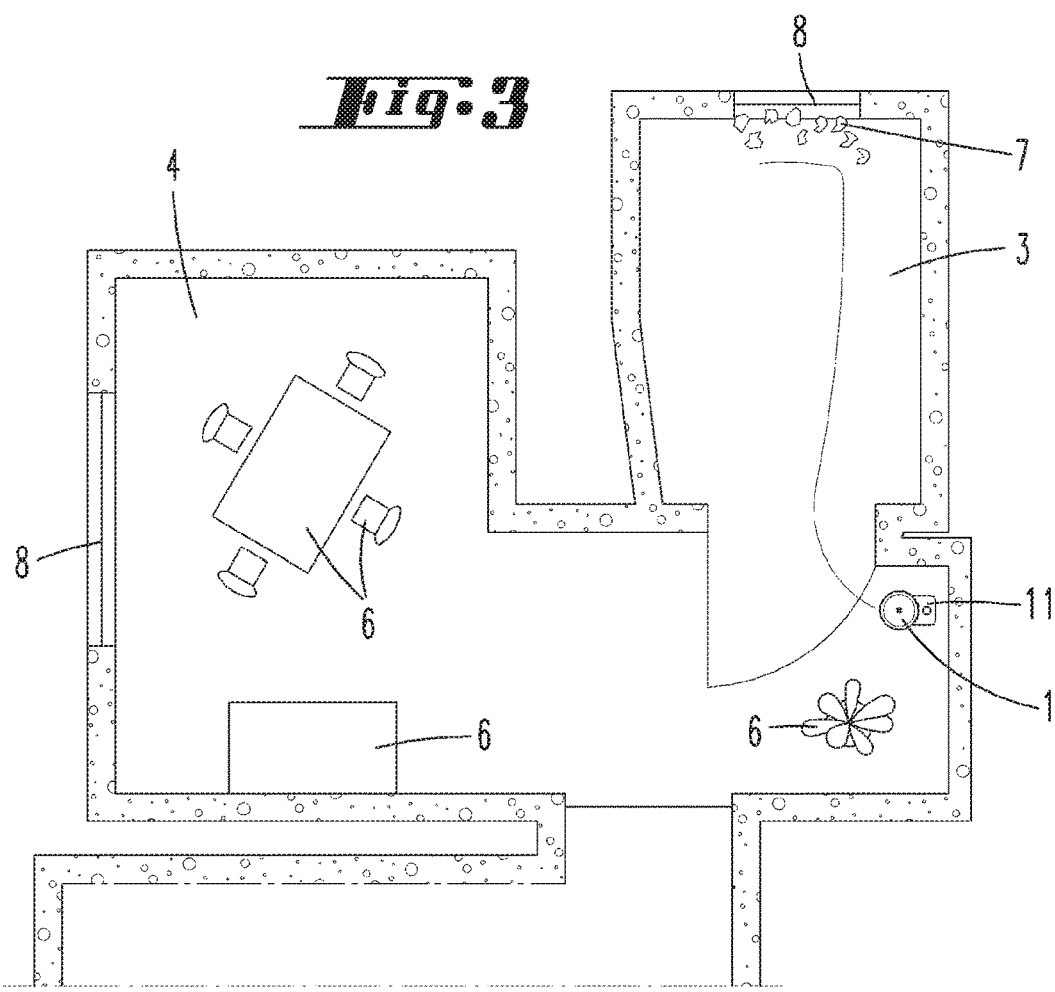
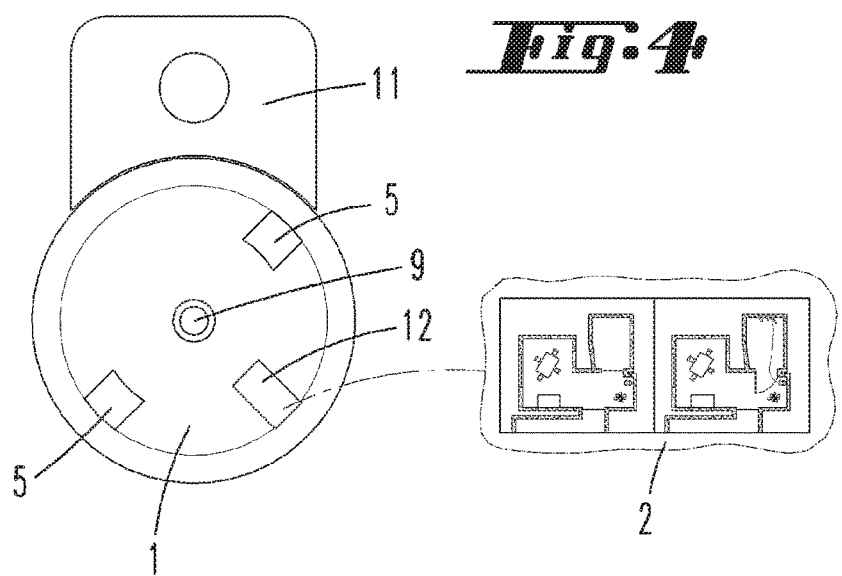

METHOD FOR OPERATING A SURFACE TREATMENT DEVICE

CROSS REFERENCE TO RELATED APPLICATIONS

This application is the National Stage of PCT/EP2016/065690 filed on Jul. 4, 2016, which claims priority under 35 U.S.C. § 119 of German Application No. 10 2015 111 392.9 filed on Jul. 14, 2015, the disclosures of which are incorporated by reference. The international application under PCT article 21(2) was not published in English.

FIELD OF TECHNOLOGY

The invention relates to a method for operating an automatically movable surface treatment device, in particular a robotic vacuum cleaner and/or a cleaning robot, wherein the surface treatment device can move in a room and possibly carries out surface treatment tasks in this case, and wherein an ultrasonic sensor detects ultrasound, in particular ultrasonic waves reflected at obstacles.

The invention likewise also relates to an automatically movable surface treatment device with an ultrasonic sensor and to a system comprising an automatically movable surface treatment device having an ultrasonic sensor and a house alarm system, in which the surface treatment device is integrated in terms of communication.

PRIOR ART

Methods for operating such a surface treatment device are well known in the prior art. The surface treatment device, in particular a vacuum cleaner and/or a cleaning robot, can thereby move back and forth inside a room and/or a home, for example by means of a stored room map, and can preferably perform cleaning tasks. It is also known to additionally equip such surface treatment devices, which predominantly serve cleaning tasks, with further functions, for example to monitor a room with regard to an unauthorized access by a person.

Publication EP 2 423 893 B1 discloses for example an automatically movable cleaning device, which detects objects by means of a sensor system, wherein one or a plurality of surrounding area characteristics are captured at least within a certain, predetermined time period, and an alarm is triggered in response to a change of an arrangement of an object or in response to an unauthorized entry by a person. The change of the arrangement of an object and/or the presence of a new object or of a person, respectively, is detected by means of a distance measuring device and/or by means of an obstacle sensor, in that a stored reference map of the room is compared with a currently measured room situation.

A method, by means of which an unauthorized entry, in particular a break-in, can be determined in a different way, is to now be created. This possibly also without the comparison of room maps.

SUMMARY OF THE INVENTION

To solve the above-mentioned object, the invention proposes a method for operating an automatically movable surface treatment device, in the case of which the ultrasonic sensor of the surface treatment device detects glass breakage noises, wherein frequencies of sound detected by means of the ultrasonic sensor are compared with reference frequencies typically occurring in the event of a glass breakage, and wherein, in the event of a match, a glass breakage, in particular a break-in through a pane of glass of a window or of a door, is determined.

According to the invention, the ultrasonic sensors of the surface treatment devices are thus not or not only used to detect obstacles in the room, but in fact to monitor the room with regard to a break-in through a pane of glass, for example of a window or a door. The knowledge that glass-breakage noises have characteristic frequencies forms the basis thereby.

The ultrasonic sensor of the surface treatment device can thus monitor the room or the home, respectively, not only for obstacles, such as, for example, walls, pieces of furniture and the like, but can in fact also serve as break-in sensor. Compared to the prior art, it is advantageous thereby that the surface processing device is no longer dependent on creating a map of the room in order to monitor the room and thus does no longer need to move into the respective room. In fact, the surface treatment device can remain at any location and can detect glass-breakage noises from there, because the ultrasonic sensors typically have a detection range of several meters. The surface treatment device can either have one or a plurality of ultrasonic sensors. The ultrasonic sensors have a microphone, which can detect characteristic frequencies of a glass breakage. In this regard, they serve as acoustic glass-breakage detectors. As a rule, characteristic frequencies are created in response to a break-in when the pane of glass is smashed and then characteristic frequencies when the pane of glass shatters and when the shards hit a surface. These frequencies, which are typical for sheets of glass of windows and/or doors, differ from the frequencies, which occur for example when drinking glasses break.

It is proposed that frequencies of between 1 kHz and 1 MHz are used as reference frequencies. The frequencies, which occur when glass of windows and/or door breaks, are typically in a frequency range of between 1 kHz and 1 MHz. Furthermore, glass breakage frequencies in the range of less than 20 kHz have a large amplitude. The frequency of 20 kHz is just barely in the audible frequency for a human. The frequencies between 20 kHz (in particular 100 kHz) and 1 MHz, in contrast, can no longer be perceived by the human ear. This frequency range can be covered with commercial ultrasonic sensors, so that the surface treatment device can be produced cost-efficiently.

Provision is furthermore made for the detected sound to be evaluated with regard to a time change, in particular a time change of frequency-dependent amplitudes. The sound waves output in response to a glass breakage are subject to a time variation, wherein a measurable amplitude initially occurs at low frequencies in the range of less than 100 kHz, in particular less than 20 kHz, at the instant a pane of glass is smashed, while sound is increasingly output at frequencies, which, by comparison, are higher, in the range of 1 MHz, for example, in response to the subsequent shattering of the glass. A typical time variation of the frequency spectrum is created through this, which is characterized by an amplitude peak during the glass breakage at a first frequency with a subsequent amplitude peak at a second frequency, which is higher in comparison. When a currently measured signal corresponds to the reference spectra of typical glass breakage situations of a pane of glass, a glass breakage is determined at a surface glass, for example that of a door or of a window. It is thus ensured that commonplace clinking noises, such as, for example, the shattering of drinking glasses, are not detected as break-in and in particular trigger an alarm.

It is thus in particular proposed that, based on the frequency spectrum of the detected sound in the event of a sudden amplitude increase at a first frequency and of a subsequent amplitude increase at a second frequency, which is larger than the first frequency, a conclusion is drawn to a glass breakage. The time sequence of the occurrence of the two amplitude increases is thereby from a few milliseconds to one second, depending on the strength and drop height of the glass.

It is proposed that the surface treatment device compares the current state of the room with the state of the room according to a stored room map, when a glass breakage is determined, wherein the surface treatment device can be moved in the room, in particular in the area of a window or a door. In addition to the detection of a glass breakage by means of the frequencies, which occur in response to a glass breakage, in particular frequency-dependent amplitudes, a determined glass breakage is additionally verified by comparing a current state of the room with the stored room map. Deviations from the stored room map, such as, for example, an open door, an open window, a missing pane of glass, shards of glass on a surface to the treated, movements by a person in the room, etc., are detected thereby. To detect the current state of the room, the surface treatment device can possibly leave a rest position to move around, in order to determine the current state in the respective room. The reliability of the detection result can be increased by verifying the detection results of the ultrasonic sensor by means of a comparison the state of the room by means of a room map.

It is furthermore proposed that the state of the room, in particular an open state of a window and/or of a door, is determined by means of a measuring device for detecting features of a room. Advantageously, this measuring device is a sensor, which is typically used to create a room map. This can be a laser scanner, advantageously in the form of a triangulation sensor. A measuring device, which has a detection range of 360 degrees around the surface treatment device, in particular lends itself. A measuring device, which is typically already arranged on an automatically movable surface treatment device, can thus be used to verify the measuring result of the ultrasonic sensor. The production costs of the surface processing device are also not increased thereby.

It is furthermore proposed that, in the event a glass breakage is determined, in particular a break-in through a pane of glass of a window or of a door, an alarm signal is output. The alarm signal serves to inform a resident, an emergency service or the like, about the break-in. In addition, the burglar can thus possibly be scared off and can be made to leave the home. Advantageously, the surface treatment device can thereby be connected to an external alarm system in terms of communication, so that the alarm signal is transferred to the emergency service by means of the alarm system.

Preferably, the sound received by the ultrasonic sensor is evaluated by means of a home alarm system, in which the surface treatment device is integrated in terms of communication, and/or an alarm signal can be output and/or prompted by the home alarm system in the event a glass breakage is determined. The sound received by the ultrasonic sensor can thus not be evaluated by means of a device of the surface treatment device itself, but in fact by means of a home alarm system, in which the surface treatment device is integrated. The surface treatment device thus needs to only have the ultrasonic sensor, while the evaluation device of the home alarm system is used. The reference frequency values, which typically occur in response to a glass breakage, which are used for the evaluation, can thereby in particular also be stored in data storage of the home alarm system. The equipment needed for the detection of a break-in is thus shifted to the home alarm system, while the surface treatment device only needs to have the ultrasonic sensor and a corresponding communication device for communication with the house alarm system. The alarm signal is advantageously furthermore also output and/or prompted by the home alarm system. If the evaluation device of the home alarm system, or in the alternative, also the evaluation device of the surface treatment device (as described above), determines a break-in, the home alarm system outputs the alarm signal. Advantageously, the alarm signal is then transferred to a corresponding emergency service (a guard service, janitor, doorman or the like). For communication with the home alarm system, the surface treatment device is advantageously connected by means of a radio connection, for example GSM, Bluetooth and the like. A mobile phone of the user can furthermore also be contacted by means of this radio connection. As a whole, the surface treatment device can thus be integrated in a complex home automation device, which, in addition to a home alarm system, can also include further devices, such as, for example, a smoke detector, a temperature sensor, a closing device or the like. Instead of a stationarily installed home alarm system, a mobile communication device, for example a mobile phone, laptop, tablet or the like, can also be used to evaluate and/or output an alarm signal.

It is furthermore proposed that the sound, which is received by the ultrasonic sensor, is evaluated with regard to the glass breakage noises, only when the ultrasonic sensor is in an exclusive receive mode, in particular during a rest state of the surface treatment device. During the exclusive receive mode, the ultrasonic sensor itself does not send out an ultrasonic signal. The exclusive receive operation thus differs from the measuring mode for detecting obstacles in the room. During the rest state, the surface treatment device is advantageously located in a base station, which serves for example to charge an accumulator of the surface treatment device. Due to the fact that the surface treatment device rests during the detection of the glass breakage noises, the ambient noises do not include any treatment noises, which are created for example by a cleaning activity or movement of the surface treatment device, so that the ultrasonic sensor can recognize glass breakage noises particularly easily.

In addition to the above-described method, the invention also proposes an automatically movable surface treatment device, in particular a vacuum cleaner and/or a cleaning robot, comprising an ultrasonic sensor, which has an evaluation device, which is embodied to compare frequencies of sound detected by means of the ultrasonic sensor with reference frequencies typically occurring in the event of a glass breakage, and, in the event of a match, to determine a glass breakage, in particular a break-in through a pane of glass of a window or of a door.

What is furthermore also proposed is a system of an automatically movable surface treatment device, having an ultrasonic sensor, in particular a vacuum cleaner and/or a cleaning robot, and a home alarm system, in which the surface treatment device is integrated in terms of communication, wherein the home alarm system has an evaluation device, which is embodied to compare frequencies of sound detected by means of the ultrasonic sensor with reference frequencies typically occurring in the event of a glass breakage, and, in the event of a match, to determine a glass breakage, in particular a break-in through a pane of glass of a window or a door.

The features and advantages described with regard to the method according to the invention accordingly also follow with regard to the automatically movable surface treatment device or the system, respectively, of a surface treatment device and a home alarm system.

BRIEF DESCRIPTION OF THE DRAWINGS

The invention will be described in more detail below by means of exemplary embodiments.

FIG. 3 shows a room map of a home comprising a plurality of rooms, FIG. 4 shows the surface treatment device comprising an evaluation device.

DESCRIPTION OF THE PREFERRED EMBODIMENTS

Figure 1:
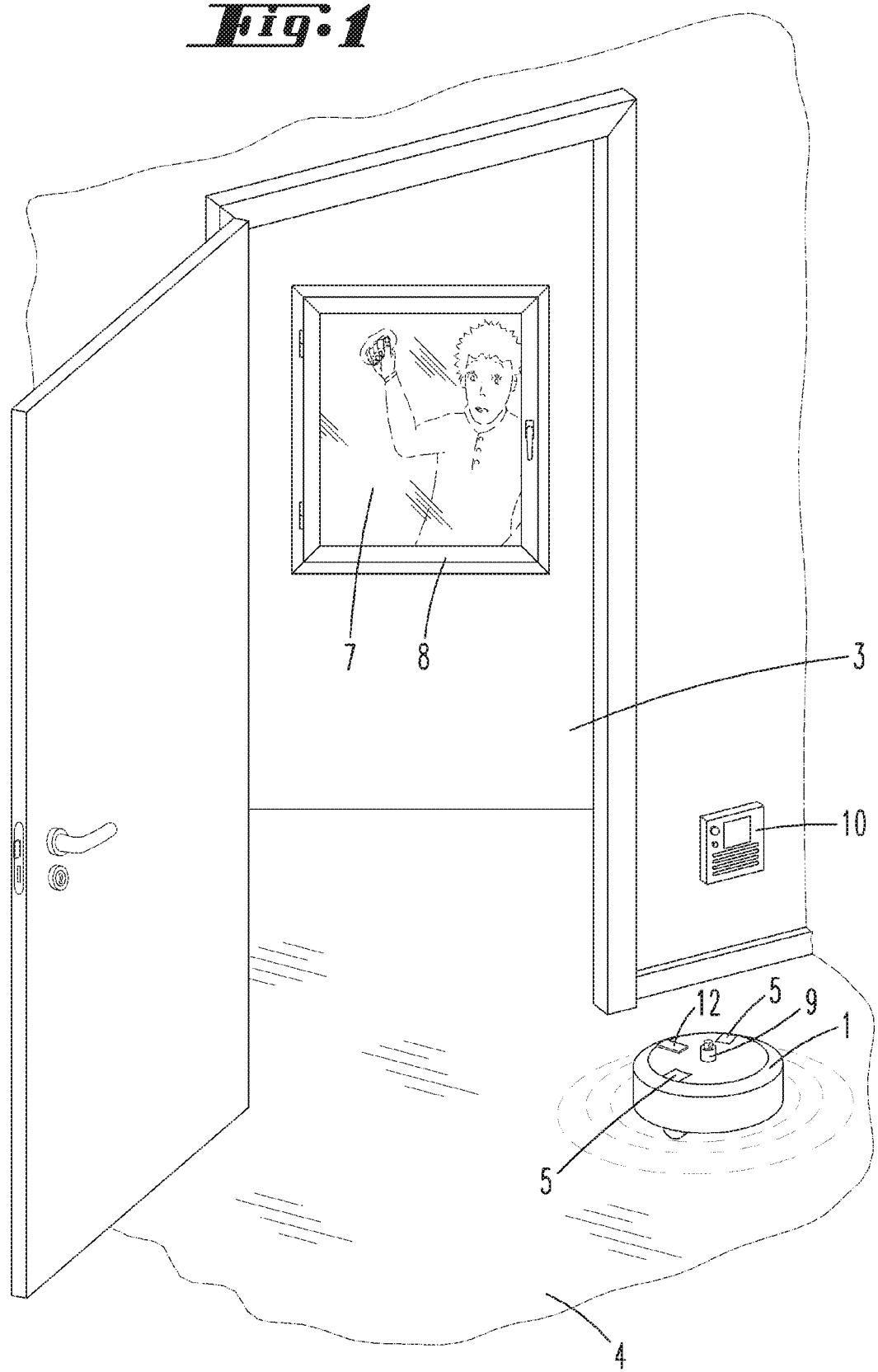
FIG. 1 shows a surface treatment device according to the invention in a monitored room.

FIG. 1 shows a part of a home comprising a plurality of rooms 3, 4, which have windows 8 with panes of glass 7. A surface treatment device 1, which is embodied here as automatically movable robotic vacuum cleaner, is located in one of the rooms 4. The surface treatment device 1 is in communication connection with a home alarm system 10, which is stationarily arranged in the room 4 in a stationary manner. The surface treatment device 1 has two ultrasonic sensors 5 for detecting obstacles 6, such as, for example, walls, pieces of furniture and the like, as well as a measuring device 9 for detecting features of a room 3, 4, for example to orientate the surface treatment device 1 in the rooms 3, 4, as well as to create a room map 2. Here, the measuring device 9 is embodied as laser scanner, which can measure in a 360 degree angle range around the surface treatment device 1. The surface treatment device 1 furthermore has an evaluation device 12, with the help of which the signals detected by the ultrasonic sensors 5 as well as the measuring device 9 can be evaluated. Advantageously, the evaluation device 12 also has data storage for storing measuring signals and reference data.

As illustrated in FIG. 1, a person is located in front of the window 8 of the room 3. The person intends to gain unauthorized entry to the room 3 through the window 8 from the outside.

Figure 2:
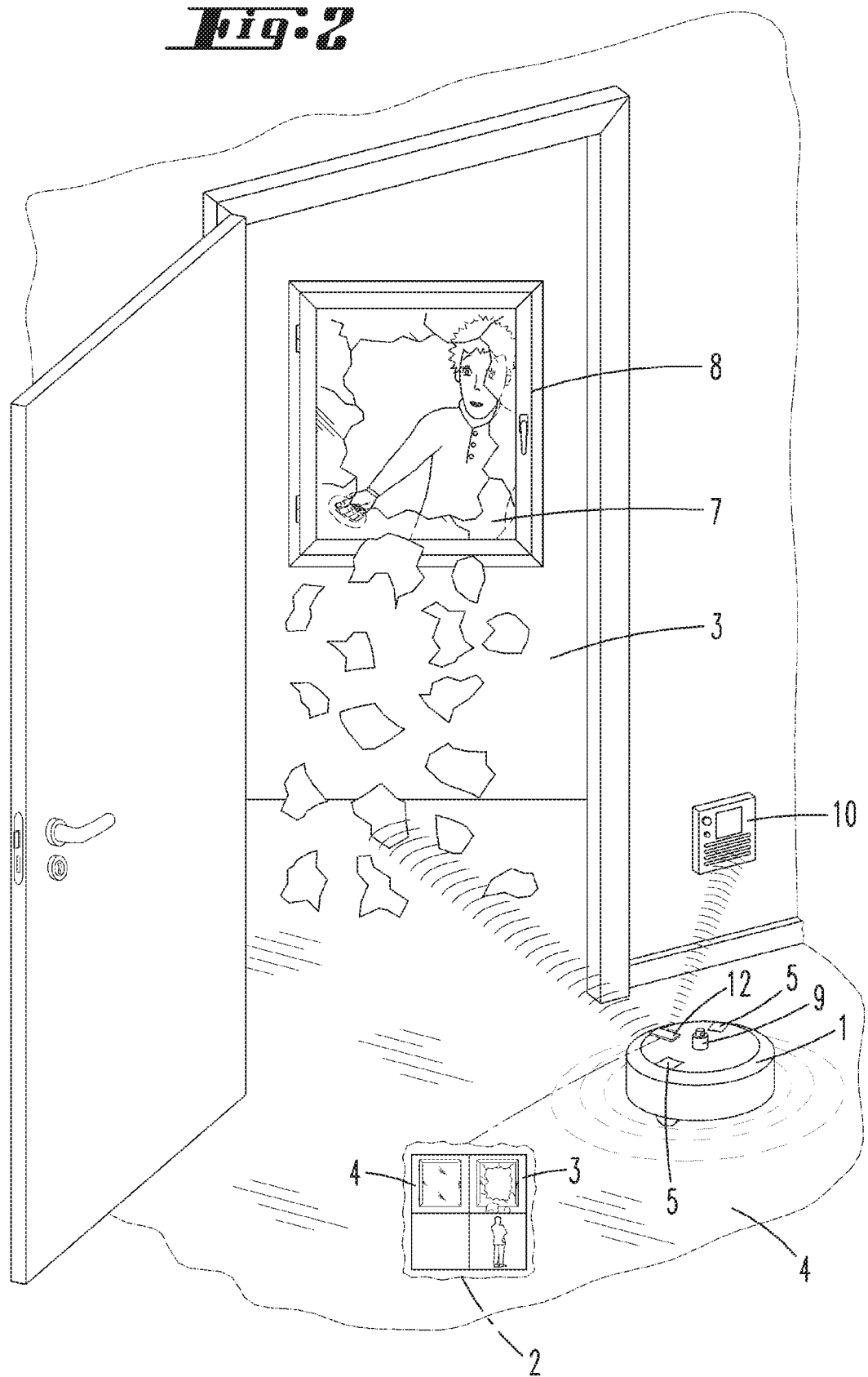
FIG. 2 shows a break-in situation into the room according to FIG. 1.

FIG. 2 shows the monitored rooms 3, 4 in a situation at a later stage. At that point in time, the person has already smashed the pane of glass 7 of the window 8. By smashing the pane of glass 7, a sound (both ultrasound as well as audible sound) with a characteristic frequency spectrum is created. In particular at low frequencies of below 100 kHz, in particular also below 20 kHz, the ultrasound spectrum has a large amplitude when the pane of glass 7 is smashed. Due to the fact that the ultrasonic sensors 5 detect the ambient noises continuously, a sudden increase of the amplitude can be measured at a certain frequency over the course of time, for example in the range of below 100 kHz/below 20 kHz (depending on size, thickness and material of the pane of glass). Due to the subsequent shattering of the pane of glass 7 and impact of the shards of the pane of glass 7 on the ground, the amplitude of a different, higher frequency increases (in particular of a frequency above 100 kHz or 20 kHz, respectively), while the amplitude created by smashing the pane of glass 8 is reduced. This time change of the sound detected by the ultrasonic sensors 5 is evaluated by means of the evaluation device 12 of the surface treatment device 1. The frequencies of the sound are thereby compared to reference frequencies typically occurring in the event of a glass breakage, which are stored in a data storage of the evaluation device 12. In the event of a match between the measured frequency spectrum and a reference spectrum, a destruction of the pane of glass 7 is determined, so that the surface treatment device 1 draws the conclusion that a person wants to gain or has gained unauthorized entry into the rooms 3, 4. The surface treatment device 1 can then send information directly to the home alarm system 10, which then outputs an acoustic alarm and/or informs an emergency center, for example a guard service. Furthermore, the surface treatment device 1 can additionally compare the current state of the room 3, 4 with the state of the room 3, 4 according to a stored room map 2 of the rooms 3, 4. The surface treatment device 1 thereby moves in the rooms 3, 4 along the area of the windows 8, in order to measure an absence of panes of glass 7 of a window 8 and/or shards of glass of the pane of glass 7 lying on the ground by means of the measuring device 9. As soon as the measuring device 9 also detects an absence of the pane of glass 7 in the room 3, a corresponding signal is transmitted to the evaluation device 12, which combines the measuring signals of the measuring device 9 with the measuring signals of the ultrasonic sensors 5 and verifies the break-in attempt/break-in. In addition, the movement of a person through the room 3, 4 can possibly be determined by means of the measuring device 9. For this purpose, the surface treatment device 1 can also move inside the rooms 3, 4 and can assign the person to the respective room 3, 4. In addition to a transmission of the break-in/break-in attempt to the home alarm system 10, the surface treatment device 1 can also transmit the information to a mobile radio unit of the resident, so that the latter is informed of the current situation in his home.

FIG. 3 shows the room situation in the home with the rooms 3, 4 in a top view. This illustration corresponds to a room map 2, which has been created for example by means of the measuring device 9 of the surface treatment device 1. The surface treatment device 1 is in a rest state in a base station 11, which is arranged in the room 4. A plurality of obstacles 6, here for example a plant, a cabinet, a table as well as four chairs, are furthermore arranged in the room 4. The room 4 as well as the adjacent room 3 each has a window 8 with a pane of glass 7. The shards caused by the break-in are located in front of the window 8 of the room 3. After the ultrasonic sensors 5 of the surface treatment device 1 has detected and recognized the glass breakage noises, the surface treatment device 1 leaves the rest state and moves through the room 3 along the illustrated route, in particular into the area of the window 8, in order to detect an absence of the pane of glass 7 or a presence of shards of glass, respectively, on the ground by means of the measuring device 9 at that location.

FIG. 4 shows a top view onto the surface treatment device 1, wherein a comparison between a room map 2 of the rooms 3, 4 (left) stored in the evaluation device 12 and the current situation of the rooms 3, 4 (right) is illustrated schematically with regard to the evaluation device 12. The evaluation device 12 verifies the destruction of the pane of glass 7 of the window 8 inside the room 3 and thus a break-in/break-in attempt by means of the comparison between the room map 2 and the current situation of the rooms 3, 4, which is sketched out. The surface treatment device 1 then sends a signal to the home alarm system 10, which, in turn, then outputs an alarm signal and/or sends the information to an emergency center.

LIST OF REFERENCE NUMERALS 1 surface treatment device
2 room map
3 room
4 room
5 ultrasonic sensor
6 obstacle
7 pane of glass
8 window
9 measuring device
10 home alarm system
11 base station
12 evaluation device

The invention claimed is:

1. A method for operating an automatically movable surface treatment device in the form of a cleaning device, comprising:
moving the surface treatment device in a room,
detecting ultrasonic waves reflected at obstacles with an ultrasonic sensor on the surface treatment device to determine obstacles of the cleaning device,
detecting sounds with the ultrasonic sensor,
comparing frequencies of the sounds detected by the ultrasonic sensor with reference frequencies typically occurring in an event of a glass breakage, and
determining an actual glass breakage in an event of a match between the detected frequencies and the reference frequencies, and
comparing with a measuring device that detects features of the room, a current state of the room with a state of the room according to a stored room map when the glass breakage is determined, wherein the surface treatment device is moved in the room in an area of a window or a door.

2. The method according to claim 1, wherein frequencies of between 1 kHz and 1 MHz are used as reference frequencies.

3. The method according to claim 1, wherein the detected sound is evaluated with regard to a time change of frequency-dependent amplitudes.

4. The method according to claim 1, wherein, the glass breakage is determined based on a frequency spectrum of the detected sound in an event of a sudden amplitude increase at a first frequency and of a subsequent amplitude increase at a second frequency, which is larger than the first frequency.

5. The method according to claim 1, further comprising outputting an alarm signal when the glass breakage is determined.

6. The method according to claim 1, wherein the sound received by the ultrasonic sensor (5) is evaluated by means of a home alarm system (10), in which the surface treatment device (1) is integrated in terms of communication, and/or wherein an alarm signal is output and/or prompted by the home alarm system (10) in the event the glass breakage is determined.

7. The method according to claim 1, wherein the sound received by the ultrasonic sensor (5) is evaluated with regard to glass breakage noises, only when the ultrasonic sensor (5) is in an exclusive receive mode.

8. An automatically movable surface treatment device (1) in the form of a cleaning robot that is configured for cleaning the surface, comprising:
an ultrasonic sensor (5) that is configured to detect ultrasonic waves reflected at obstacles as well as sound,
an evaluation device (12), which is embodied to compare frequencies of the sound detected by means of the ultrasonic sensor (5) with reference frequencies typically occurring in an event of a glass breakage, and, in an event of a match, to determine the glass breakage, and
a measuring device that is configured for detecting features of a room in order to orient the surface treatment device in the room and to create a room map.

9. A system of an automatically movable surface treatment device (1) in the form of a cleaning robot that is configured for cleaning a surface and having an ultrasonic sensor that is configured to detect ultrasonic waves reflected at obstacles as well as sound, and a house alarm system (10), in which the surface treatment device (1) is integrated in terms of communication, wherein the house alarm system (10) has an evaluation device, which is embodied to compare frequencies of the sound detected by means of the ultrasonic sensor (5) with reference frequencies typically occurring in an event of a glass breakage, and, in an event of a match, to determine the glass breakage, and wherein the surface treatment device has a measuring device that is configured for detecting features of a room in order to orient the surface treatment device in the room and to create a room map.

10. The system according to claim 9, wherein evaluation device is configured to evaluate the detected sound with regard to a time change of frequency-dependent amplitudes.

11. The system according to claim 9, wherein evaluation device is configured to determine the glass breakage based on a frequency spectrum of the detected sound in an event of a sudden amplitude increase at a first frequency and of a subsequent amplitude increase at a second frequency, which is larger than the first frequency.

* * * * *